3,300,499
4-ALKYL (OR ALKENYL) - 1,4 - DIHYDRO - 1 - OXO-BENZO[f][1,7]NAPHTHYRIDINE 2-CARBOXYLIC ACID DERIVATIVES
George Y. Lesher, Schodack, N.Y., assignor to Sterling Drug Inc., New York, N.Y., a corporation of Delaware
No Drawing. Filed Jan. 27, 1964, Ser. No. 340,522
16 Claims. (Cl. 260—287)

This application is a continuation-in-part of my copending application Serial Number 263,142, filed March 6, 1963, and now abandoned.

This invention relates to benzo[f][1,7]-naphthyridine derivatives.

The invention in its composition aspect is described as residing in the concept of a 1,4-dihydrobenzo[f][1,7]naphthyridine-2-carboxylic acid substituted in the 1-position by oxo and in the 4-position by lower-alkyl or lower-alkenyl.

Illustrative and preferred embodiments of my compounds are those of Formula I

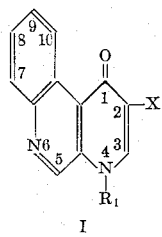

I where X is carboxy or lower-carbalkoxy, $R_1$ is lower-alkyl or lower-alkenyl. The benzo[f][1,7]naphthyridine nucleus can bear substituents at positions 5, 7, 8, 9 and 10, and, as noted hereinbelow, at position 7. Said substituents are illustrated by, but not limited to lower-alkyl, lower-alkoxy, hydroxy, halo, lower-alkylamino, lower-alkylmercapto, and the like.

The term "lower-carbalkoxy," as used herein, e.g., for X in Formula I, means carbalkoxy radicals where the alkoxy portion can be straight- or branch-chained and has preferably from one to six carbon atoms, as illustrated by carbomethoxy, carbethoxy, carbo-n-propoxy, carbisopropoxy, carbo-n-butoxy, carbo-n-hexoxy, and the like.

Each of the terms "lower-alkyl" and "lower-alkoxy," as used herein, e.g., as substituents in the benzo[f][1,7]naphthyridine ring or for $R_1$ (lower-alkyl only) in Formula I, means lower-alkyl or lower-alkoxy radicals having preferably from one to six carbon atoms which can be arranged as straight or branched chains, and are illustrated by methyl, ethyl, n-propyl, isopropyl, 2-butyl, n-hexyl, etc., for lower-alkyl; and, by methoxy, ethoxy, n-propoxy, isopropoxy, isobutoxy, n-amoxy, n-hexoxy, etc., for lower-alkoxy.

The term "lower alkenyl," as used herein, e.g., for $R_1$ in Formula I, means alkenyl radicals having preferably from three to six carbon atoms, as illustrated by 2-propenyl, 2-methyl-2-propenyl, 2-butenyl, 3-butenyl, 2-hexenyl, and the like.

The term "halo," as used herein, e.g., as a substituent of the benzo[f][1,7]naphthyridine ring, means chloro, bromo, iodo or fluoro.

The invention in its process aspect, is described as residing in the concept of reacting a 1-hydroxy-2-X-benzo[f][1,7]naphthyridine with a lower-alkyl or lower-alkenyl ester of a strong inorganic acid or an organic sulfonic acid, having the formula $R_1$—An, where An is an anion of a strong inorganic acid, i.e., an acid which is practically completely dissociated in aqueous solution, or an organic sulfonic acid, e.g., chloride, bromide, iodide, sulfate, benzenesulfonate, para-toluenesulfonate, and the like, and $R_1$ and X have the meanings given above for Formula I. The chloride, bromide or iodide is preferred because of the more ready availability of the requisite lower-alkyl or lower-alkenyl halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium bicarbonate, potassium bicarbonate, sodium alkoxides, potassium alkoxides, sodium amide, and the like. The purpose of the acid-acceptor is to take up the hydrogen halide (or HAn) which is split out during the course of the reaction. The reaction can be carried out either in the presence or absence of a suitable solvent, but preferably in a solvent such as a lower-alkanol, acetone, dioxane, dimethylformamide, methyl isobutyl ketone, dimethyl sulfoxide, or a mixture of such solvents, e.g., a mixture of water and a lower-alkanol. The reaction is generally carried out at a temperature between about room temperature (about 25° C.) and 150° C., preferably at reflux, in a lower-alkanol solvent, in a mixture of water and a lower-alkanol, or in dimethylformamide.

My process thus comprises reacting the corresponding 1-hydroxy-2-X-benzo[f][1,7]naphthyridine of the Formula II

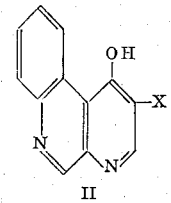

II where X has the meaning given above for Formula I, with an ester having the formula $R_1$—An, where $R_1$ has the meaning given above for formula I and An is an anion of a strong inorganic acid or an organic sulfonic acid, in the presence of an acid-acceptor.

When X is carboxy, i.e., when the intermediate is 1-hydroxybenzo[f][1,7]naphthyridine - 2 - carboxylic acid, the reaction is conveniently carried out by refluxing the acid with a lower-alkyl or lower-alkenyl ester, preferably halide, in aqueous ethanol in the presence of potassium or sodium hydroxide to yield the corresponding 1,4-dihydro-4-$R_1$-1-oxobenzo[f][1,7]naphthyridine - 2 - carboxylic acid; the same 2-carboxylic acid is also obtained using these reaction conditions and a lower-alkyl 1-hydroxybenzo[f][1,7]naphthyridine-2-carboxylate as the intermediate, the ester hydrolyzing under the reaction conditions to form the acid. If the final product is desired in ester form, e.g., the ethyl ester, the intermediate ethyl 1-hydroxybenzo[f][1,7]naphthyridine-2-carboxylate is reacted as above using a non-aqueous medium, for example, using refluxing ethanol as the solvent and sodium ethoxide as the acid-acceptor or using dimethylformamide as the solvent and anhydrous potassium carbonate as the acid-acceptor.

Also within the scope of the invention are salts of my above-described 1,4-dihydro-4-$R_1$ - 1 - oxobenzo[f][1,7]-naphthyridine-2-carboxylic acids. Preferred types of salts are those having cations which do not increase the toxicity of the compound as a whole toward animal organisms. These comprise the alkali metal salts, e.g., the sodium or potassium salts; the lower-alkaline earth metal salts, e.g., magnesium or calcium salts; and, the ammonium or organic amine salts, e.g., diethanolamine or N-methylglucamine salts. Although therapeutically acceptable salts are preferred, other and all cationic salts are within the scope of my invention. All such salts, including those having toxic cations, are useful in characterizing the free acids and as intermediates in purification of the free acids. The salts are prepared from the acids using conventional methods for converting acids into salts.

Also encompassed by my invention are quaternary ammonium salts of the aforesaid compounds, quaternization forming at the 6-ring-nitrogen. These salts also have antibacterial properties and are useful for further identification of the aforesaid compounds and, also, as intermediates for the preparation of corresponding 5-oxo derivatives described hereinbelow. The quaternary ammonium salts are obtained by the addition of esters having a molecular weight less than about 200 to the free base form of the compounds. A preferred class of esters comprises loweralkyl, lower-alkenyl or benzyl esters of inorganic acids or organic sulfonic acids of the formula Z–An' where Z is lower-alkyl, lower-alkenyl or benzyl and An' is defined as An above. Z when benzyl can be substituted in the benzene ring by from one to three substituents illustrated by, but not limited to lower-alkyl, lower-alkoxy, halo, nitro, lower-alkylamino, lower-alkylmercapto, and the like. Z–An' is thus illustrated by, but not limited to, methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, p-chlorobenzyl chloride, p-nitrobenzyl chloride, o-chlorobenzyl chloride, 3,4-dichlorobenzyl chloride, p-methoxybenzyl chloride, and the like. The quaternary ammonium salts are prepared by mixing the free base and the alkyl, alkenyl or benzyl esters in an organic solvent inert under the conditions of reaction, for example, ethanol, methanol, ether, acetonitrile and the like or, alternatively, in th absence of a solvent. Heating is preferably used to facilitate the reaction, although quaternary formation takes place at room temperature but a longer reaction time is needed. The quaternary ammonium salt separates directly or can be obtained by concentration of the solution.

My invention also comprehends the intermediate 1-hydroxy-2-X-benzo[f][1,7]naphthyridines of Formula II (above). These intermediates were prepared according to the procedure presented structurally as follows:

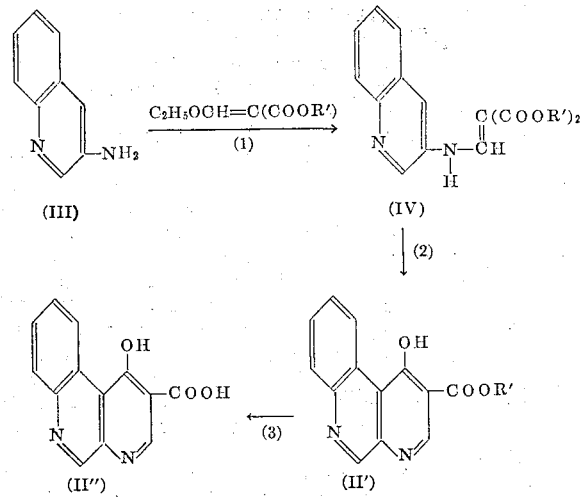

where X has the meaning given above for Formula I and R' is lower-alkyl. The salts of (II''), like those of the 2-carboxylic acid of (I), are prepared by conventional methods.

The molecular structures of the final products and intermediates of my invention are established by their modes of synthesis and confirmed by the correspondence of calculated and found values for the elementary analyses for representative examples and by infrared, ultraviolet and NMR spectral analyses.

Embodiments of another aspect of my invention are the 1,4,5,6-tetrahydro-6-substituted-1,5-dioxo compounds of the Formula V

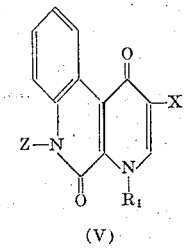

where $R_1$, Z and X have the meanings given hereinabove. The compounds also have antibacterial properties and are prepared by oxidizing the corresponding compounds of the Formula VI

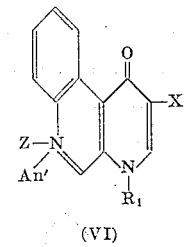

with an oxidizing agent, preferably using a water-soluble ferricyanide, e.g., an alkali ferricyanide in an alkaline medium. Other suitable oxidizing agents are air and oxygen.

My 1,4 - dihydro-1-oxo - 4 - substituted-benzo[f][1,7]-naphthyridine-2-carboxylic acids and derivatives have been tested by standard biological evaluation procedures and found to have antibacterial properties, e.g., when tested according to standard in vitro bacteriological evaluation procedures they have been found to possess antibacterial activity, for example,, against *Staphylococcus aureus, Clostridium welchii, Pseudomonas aeruginosa* and *Eberthella typhi*, at test concentration levels in the range of 0.005 mg./cc. to about 1.0 mg./cc., as illustrated below in the examples. Preferred embodiments were found to have significant in vivo activity against Gram-negative bacteria, e.g., *Klebsiella pneumoniae* and *Escherichia coli*, and against Gram-positive bacteria, e.g., *Staphylococcus aureus*, in Swiss mice when administered orally and/or subcutaneously at dose levels in the range of about 50 to 400 mg./kg./day.

The following examples will further illustrate the invention without, however, limiting it thereto.

*Example 1*

1,4 - dihydro-4-methyl - 1 - oxobenzo[f][1,7]naphthyridine-2-carboxylic acid was prepared as follows: A mixture containing 16.8 g. of 1-hydroxybenzo[f][1,7]naphthyridine-2-carboxylic acid, 10.0 g. of methyl iodide, 78.5 cc. of 10% aqueous potassium hydroxide, 60 cc. of water and 200 cc. of ethanol was refluxed on a steam bath for ninety minutes. To the reaction mixture was added 78.5 cc. of 10% aqueous potassium hydroxide solution and 10 cc. of methyl iodide and refluxing was continued for an additional ten hours. The reaction mixture was filtered, evaporated to about one-half its volume and poured into an excess of dilute aqueous hydrochloric acid. The resulting precipitate was collected; triturated successively with water, ethanol and dimethylformamide; and recrystallized twice from dimethylformamide. It was then triturated in boiling ethanol, filtered, washed with ethanol and dried in a vacuum oven at 60° C. to yield 6.6 g. of the product, 1,4 - dihydro - 4 - methyl - 1 - oxobenzo[f][1,7]naphthyridine-2-carboxylic acid, M.P. 340° C. with decomposition.

1,4-dihydro-4-methyl-1-oxobenzo[f][1,7]naphthyridine-2-carboxylic acid was found to have in vivo activity against *Klebsiella pneumoniae* in mice when administered orally or subcutaneously at dose levels as low as 50 mg./kg./day (8 out of 10 mice survived with subcutaneous dose of 50 mg./kg./day, and 9 out of 10 survived with subcutaneous or oral dose of 100 mg./kg./day); against *Staphylococcus aureus* in mice when administered orally at 200 mg./kg./day (9 out of 10 survived); and, against *Escherichia coli* in mice when administered orally at 200 mg./kg./day (10 out of 10 survived). This same compound when tested according to standard in vitro bacteriological procedures was found to possess antibacterial activity, for example, as follows:

| Organism | Minimum Effective Concentration (mg./cc.) | |
| --- | --- | --- |
| | Bacteriostatic | Bactericidal |
| Staphylococcus aureus | 0.025 | 0.25 |
| Eberthella typhi | 0.0076 | 0.5 |
| Clostridim welchii | 0.0076 | 0.1 |
| Pasteurella boviseptica | 0.0075 | 0.05 |
| Escherichia coli | 0.05 | 0.5 |

The intermediate 1-hydroxybenzo[f][1,7]-naphthyridine-2-carboxylic acid was prepared by hydrolysis of the corresponding ethyl ester as follows: A mixture containing 47 g. of ethyl 1-hydroxybenzo[f][1,7]naphthyridine-2-carboxylate and 280 cc. of 10% aqueous potassium hydroxide solution was heated on a steam bath for about ninety minutes. The reaction mixture was treated with decolorizing charcoal, filtered, and the filtrate poured into 100 cc. of 6 N hydrochloric acid and water. The resulting solid was collected, crystallized from dimethylformamide, washed with ethanol and water, triturated with water, washed further with ethanol, and dried at 60° C. in a vacuum oven to yield 39 g. of the product, 1-hydroxybenzo[f][1,7]naphthyridine-2-carboxylic acid, M.P. 311–312° C. with decomposition.

The above ethyl ester was prepared in two steps as follows: A mixture containing 109 g. of 3-aminoquinoline in 165 g. of diethyl ethoxymethylenemalonate was heated on a steam bath for one hundred and five minutes. The reaction mixture was diluted with ethanol to a volume of about 450 cc. and cooled. The solid that separated was collected to yield 230 g. of diethyl N-(3-quinolyl)-aminomethylenemalonate, M.P. 112–115° C. A sample recrystallized from ethanol and dried in a vacuum oven at 60° C. melted at 108.2–109.6° C. (corr.).

A mixture containing 230 g. of diethyl N-(3-quinolyl)-aminomethylenemalonate and 2.3 liters of Dowtherm A (eutectic mixture of diphenyl and diphenyl ether) was heated at 245° C. for about twenty minutes. The reaction mixture was allowed to cool to 40° C. and the solid that separated was collected, washed with benzene and n-pentane and dried to yield 100 g. of ethyl 1-hydroxybenzo[f][1,7]naphthyridine-2 carboxylate, M.P. 286–288° C. with decomposition.

Example 2

1,4-dihydro-4-ethyl-1-oxobenzo[f][1,7]naphthyridine-2-carboxylic acid was prepared as follows: A solution containing 21.4 g. of ethyl 4-hydroxybenzo[f][1,7]naphthyridine-2-carboxylate, 112 cc. of 10% aqueous potassium hydroxide solution, 200 cc. of ethanol and 15 cc. of ethyl iodide was refluxed on a steam bath for twenty hours. An additional 15 cc. portion of ethyl iodide was added and the reaction refluxed for an additional two hours. The reaction mixture was chilled and the separated solid was filtered off. The filtrates were evaporated to near dryness to remove the ethanol and then diluted with water. The aqueous solution was made slightly acid with 6 N hydrochloric acid and the resulting precipitate was collected. The solid was dissolved in aqueous potassium hydroxide solution. The solution was treated with decolorizing charcoal, filtered and poured into a slight excess of acetic acid. The solid that separated was collected and recrystallized from dimethylformamide to yield 5.0 g. of the product, 1,4-dihydro-4-ethyl-1-oxobenzo[f][1,7]naphthyridine-2-carboxylic acid, M.P. 301–302° C. with decomposition.

1,4-dihydro-4-ethyl-1-oxobenzo[f][1,7]naphthyridine-2-carboxylic acid was found to have in vivo activity against *Klebsiella pneumoniae* in mice when administered orally at a dose level of 400 mg./kg./day (9 out of 10 mice survived). When tested in vitro, this compound was found to have bacteriostatic activity against *Eberthella typhi* and *Clostridium welchii* at a concentration of 0.025 mg./cc. for each organism; and, to have bactericidal activity against these organisms at respective concentrations of 0.75 mg./cc. and 0.5 mg./cc.

Example 3

1,4-dihydro-1-oxo-4-n-propylbenzo[f][1,7]-naphthyridine-2-carboxylic acid was prepared as follows: A mixture containing 20.4 g. of ethyl 1-hydroxybenzo[f][1,7]naphthyridine-2-carboxylate and 80 cc. of 10% aqueous potassium hydroxide solution was heated on a steam bath for ninety minutes. To this mixture was added 200 cc. of ethanol and about 20 cc. of n-propyl bromide. The resulting mixture was refluxed for twenty-two hours. The reaction mixture was filtered to remove some green solid and to the filtrate was added 60 cc. of 10% aqueous potassium hydroxide solution plus additional n-propyl bromide, and refluxing was continued for another fourteen and one-half hours. The reaction mixture was acidified and the resulting precipitate collected. The precipitate was dissolved in water plus 10% aqueous potassium hydroxide solution, the solution treated with decolorizing charcoal and filtered, and the filtrate treated with hydrochloric acid. The resulting precipitate was collected, washed with water and dried. The solid was then triturated with two liters of boiling n-propanol, and the undissolved material collected, recrystallized from dimethylformamide, washed with ethanol and dried to yield 2.4 g. of the product, 1,4-dihydro-1-oxo-4-n-propylbenzo[f][1,7]naphthyridine-2-carboxylic acid, M.P. 258.4–260.4° C. (corr.).

1,4-dihydro-1-oxo-4-n-propylbenzo[f][1,7]-naphthyridine-2-carboxylic acid when tested in vitro was found to have bacteriostatic activity against *Staphylococcus aureus*, *Eberthella typhi* and *Clostridium welchii* at respective concentrations of 0.25, 1.0 and 0.05 mg./cc.

Example 4

4-allyl-1,4-dihydro-1-oxobenzo[f][1,7]-naphthyridine-2-carboxylic acid was prepared as follows: A solution containing 21.8 g. of ethyl 4-hydroxybenzo[f][1,7]naphthylridine-2-carboxylate and 112 cc. of 10% aqueous potassium hydroxide solution was heated on a steam bath for one hour, treated with decolorizing charcoal and filtered. To the filtrate was added 250 cc. of ethanol and 15 cc. of allyl bromide and the resulting mixture refluxed on a steam bath for three hours. A 50 cc. portion of 10% aqueous potassium hydroxide solution was added, the resulting solution treated with decolorizing charcoal and filtered. The filtrate was poured into a slight excess of 6 N hydrochloric acid, 10% aqueous potassium hydroxide solution was added to near neutrality, the mixture chilled and the resulting solid collected. The solid was washed with water and then sparingly with ethanol, dried, recrystallized twice from acetonitrile and once from dimethylformamide, and then dried in vacuo at 60° C. to yield 4.7 g. of the product, 4-allyl-1,4-dihydro-1-oxobenzo[f][1,7]naphthyridine-2-carboxylic acid, M.P. 266.4–268.2° C. (corr.).

4-allyl-1,4-dihydro-1-oxobenzo[f][1,7]-naphthyridine-2-carboxylic acid when tested in vitro was found to have bacteriostatic activity against *Eberthella typhi*, *Staphyl*- ococcus aureus, and *Clostridium welchii* at respective concentrations of 0.5 mg./cc., 0.1 mg./cc. and 0.075 mg./cc.; and, to have bactericidal activity against *Clostridium welchii* at a concentration of 0.75 mg./cc.

Example 5

1,4-dihydro-4,9-dimethyl-1-oxobenzo[f][1,7]-naphthyridine-2-carboxylic acid was prepared following the procedure described in Example 1 using 25.4 g. of 9-methyl-1-hydrobenzo[f][1,7]naphthyridine-2-carboxylic acid, 140 cc. of 10% aqueous potassium hydroxide solution, about 20 cc. of methyl iodide and 350 cc. of ethanol. There was thus obtained 5.4 g. of the product 1,4-dihydro-4,9-dimethyl-1-oxobenzo[f][1,7]naphthyridine - 2 - carboxylic acid, M.P. 329° C. with decomposition, after several recrystallizations from dimethylformamide, trituration with boiling ethanol and drying at 60° C. in a vacuum oven.

The intermediate 9 - methyl - 1 - hydroxybenzo[f][1,7]-naphthyridine-2-carboxylic acid was prepared in several steps following the procedures described in Example 1. Diethyl N-(6-methyl - 3 - quinolyl)aminomethylenemalonate, M.P. 119.8–121.2° C. (corr.), was obtained in 65% yield (87.5 g.) using 89 g. of diethyl ethoxymethylenemalonate and 63 g. of 3-amino-6-methylquinoline and a recrystallizing solvent of ethanol. Ethyl 1-hydroxy-9-methylbenzo[f][1,7]naphthyridine-2-carboxylate was obtained using 75 g. of diethyl N-(6-methyl-3-quinolyl)-aminomethylenemalonate and 1 liter of Dowtherm A. This ester was hydrolyzed to the corresponding acid using 336 cc. of 10% aqueous potassium hydroxide and a heating period of two and one half hours. There was thus obtained 8.6 g. of 1-hydroxy-9-methylbenzo[f][1,7]naphthyridine-2-carboxylic acid, M.P. 317–319° C. with decomposition, after one recrystallization from dimethylformamide-ethanol and two recrystallizations from dimethylformamide.

1,4-dihydro-4,9-dimethyl-1-oxobenzo[f][1,7]-naphthyridine-2-carboxylic acid when tested in vitro was found to have bacteriostatic activity against *Staphylococcus aureus, Eberthella typhi* and *Clostridium welchii* at respective concentrations of 0.025, 0.05 and 0.0075 mg./cc.; and, to have bactericidal activity against the same three organisms at respective concentrations of 0.5, 0.75 and 0.5 mg./cc.

Example 6

1,4-dihydro-4,5-dimethyl-1-oxobenzo[f][1,7]-naphthyridine-2-carboxylic acid was prepared as follows: A mixture containing 15 g. of ethyl 1-hydroxy-5-methylbenzo[f][1,7]naphthyridine-2-carboxylate, 15.6 g. of anhydrous potassium carbonate and 150 cc. of dimethylformamide was heated on a steam bath for fifteen minutes. A 15 cc. portion of methyl iodide was added to the reaction mixture with stirring and heating was continued for an additional three hours. The reaction mixture was poured into 1.5 liters of water, stirred for fifteen minutes, treated with decolorizing charcoal and filtered. The filtrate, which contained ethyl 1,4-dihydro-4,5-dimethyl-1-oxobenzo[f][1,7]-naphthyridine-2-carboxylate, was treated with an excess of 35% aqueous sodium hydroxide solution and the mixture was heated on a steam bath for two hours and then filtered. Acetic acid was added to the filtrate until weakly acidic and the precipitate that separated was collected. The precipitate was recrystallized from a large volume of isopropyl alcohol. The solid was then taken up in dilute ammonium hydroxide solution, the solution treated with decolorizing charcoal and filtered, and the filtrate acidified with an excess of acetic acid. The resulting precipitate was collected and dried in a vacuum oven at 70° C. to yield 2.5 g. of the product, 1,4-dihydro-4,5-dimethyl-1-oxobenzo[f][1,7]naphthyridine-2-carboxylic acid, M.P. 261.6–263.0° C. (corr.).

1,4-dihydro-4,5-dimethyl-1-oxobenzo[f][1,7]-naphthyridine-2-carboxylic acid when tested in vitro was found to have bacteriostatic activity against *Staphylococcus aureus* and *Eberthella typhi* at respective concentrations of 0.1 and 0.5 mg./cc.

The intermediate 1-hydroxy - 5 - methylbenzo[f][1,7]-naphthyridine-2-carboxylic acid was prepared in several steps following the procedure described in Example 1. Diethyl N-(2-methyl - 3 - quinolyl)aminomethylenemalonate, M.P. 143.0–143.6° C. (corr.), was obtained in 80% yield (79 g.) using 47.5 g. of 3-amino-2-methylquinoline and 65 g. of diethyl ethoxymethylenemalonate. A 79 g. portion of diethyl N-(2-methyl-3-quinolyl)aminomethylenemalonate was cyclized by heating in 800 cc. of Dowtherm A to obtain ethyl 1-hydroxy-5-methylbenzo-[f][1,7]-naphthyridine-2-carboxylate which melted at 189–191° C. when recrystallized successively from acetic acid and ethanol. A portion of this ester was then hydrolyzed by heating with 5% aqueous potassium hydroxide solution to yield 1 - hydroxy-5-methylbenzo[f][1,7]-naphthyridine-2-carboxylic acid, which was recrystallized from 6 N hydrochloric acid to give the hydrochloride salt, M.P. 322–323° C. with decomposition.

Example 7

1,4 - dihydro - 4,6 - dimethyl - 1 - oxobenzo[f][1,7]-naphthyridinium-2-carboxylic acid methosulfate was prepared as follows: A mixture containing 12.7 g. of 1,4-dihydro - 4 - methyl - 1 - oxobenzo[f][1,7]naphthyridine-2-carboxylic acid and 130 cc. of methyl sulfate was refluxed gently for about ten minutes and allowed to cool to room temperature. The reaction mixture was diluted to about 600 cc. with acetone. The precipitate that separated was collected, washed well with acetone and dried at 80° for about two hours. The solid was dissolved in about 125 cc. of hot water, the solution treated with decolorizing charcoal and filtered, and the filtrate diluted with acetone to a volume of about 350 cc. The solid that separated was collected and dried in a vacuum oven at 60° C. to yield 14.0 g. of the product, 1,4-dihydro-4,6-dimethyl - 1 - oxobenzo[f][1,7]naphthyridinium - 2 - carboxylic acid methosulfate, M.P. 276.2–278.8° C. (corr.) with decomposition.

1,4 - dihydro - 4,6 - dimethyl - 1 - oxobenzo[f][1,7]-naphthyridine-2-carboxylic acid when tested in vitro was found to have bacteriostatic activity against *Staphylococcus aureus, Eberthella typhi* and *Clostridium welchii* at respective concentrations of 0.75, 0.25 and 1.0 mg./cc.

Example 8

4,6 - dimethyl - 1,5 - dioxo - 1,4,5,6 - tetrahydrobenzo-[f][1,7]naphthyridine-2-carboxylic acid was prepared as follows: To a cold solution containing 9.5 g. of 1,4-dihydro - 4,6 - dimethyl - 1 - oxobenzo[f][1,7]naphthyridine-2-carboxylic acid methosulfate in 200 cc. of water was added simultaneously with stirring two different solutions, one containing 18 g. of potassium ferricyanide in 200 cc. of water and the other containing 4.5 g. of sodium hydroxide in 100 cc. of water, the temperature of the reaction mixture being kept at about 10–20° C. and the addition taking place over a period of about thirty minutes. The reaction mixture was next stirred at room temp. for ninety minutes and then heated on the steam bath for another thirty minutes. The reaction mixture was filtered; the filtrate acidified with hydrochloric acid; and the precipitate collected, triturated with water and dried at 90° C. in a vacuum oven. The solid was recrystallized twice from dimethylformamide, triturated with hot ethanol and dried for four hours in a vacuum oven at 120° C. to yield 5.5 g. of the product, 4,6-dimethyl-1,5-dioxo-1,4,5,6 - tetrahydrobenzo[f][1,7]naphthyridine - 2 - carboxylic acid, M.P. 320–321° C. with decomposition.

4,6 - dimethyl - 1,5 - dioxo - 1,4,5,6 - tetrahydrobenzo-[f][1,7]naphthyridine-2-carboxylic acid when tested in vitro was found to have bacteriostatic activity against *Staphylococcus aureus, Eberthella typhi, Clostridium welchii* and *Pseudomonas aeruginosa* at respective concentrations of 0.025, 0.01, 0.005 and 1.0 mg./cc.; and, to have bactericidal activity against *Clostridium welchii* at a concentration of 0.25 mg./cc. Following the procedures described in Examples 1-6 and using corresponding molar equivalent quantities of the appropriate 1-hydroxybenzo[f][1,7]naphthyridine-2-carboxylic acid and lower-alkyl or lower-alkenyl ester, preferably halide or sulfate, the compounds of Table A can be prepared.

TABLE A

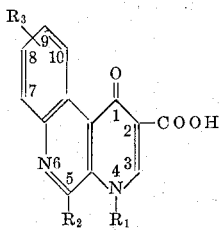

| Ex. | $R_1$ | $-R_2$ | $R_3$ |
|---|---|---|---|
| 9 | $CH_3$ | $CH_3$ | 8,9-$(OCH_3)_2$ |
| 10 | $CH_3$ | $OC_4H_9$-n | H |
| 11 | $CH_2CH=CHCH_3$ | $OC_2H_5$ | H |
| 12 | $CH_3$ | $OCH_3$ | H |
| 13 | $C_2H_5$ | $CH_3$ | 8,9-$O_2CH_2$ |
| 14 | 2-$C_4H_9$ | $CH_3$ | H |
| 15 | n-$C_5H_{13}$ | H | 9-$CH_3$ |
| 16 | $CH_2CH=CH(CH_2)_2CH_3$ | H | 9-$CH_3$ |
| 17 | $CH_3$ | H | 7-$C_2H_5$ |
| 18 | $CH_3$ | $CH_3$ | 10-$CH_3$ |
| 19 | $CH_2CH=CH_2$ | $C_2H_5$ | 9,10-$(CH_3)_2$ |
| 20 | $CH_3$ | $CH_3$ | 7-$OCH_3$ |
| 21 | $CH_3$ | $CH_3$ | 9-$CH_3$-10-$OCH_3$ |
| 22 | $CH_3$ | H | 8-Cl |
| 23 | $CH_3$ | H | 8,10-$Cl_2$ |
| 24 | $CH_3$ | $CH_3$ | 8-Br |
| 25 | $CH_3$ | H | 8,9-$(OCH_3)_2$ |
| 26 | $CH_3$ | H | 8,9-$(CH_3)_2$ |
| 27 | $C_2H_5$ | H | 7-$OCH_3$ |
| 28 | $CH_3$ | H | 10-Cl |

The intermediate 1-hydroxybenzo[f][1,7]-naphthyridine-2-carboxylic acids needed to prepare the compounds of Table A can be prepared in three steps following the procedures described in Example 1 for the preparation of 1 - hydroxybenzo[f][1,7]naphthyridine - 2-carboxylic acid and using corresponding molar equivalent quantities of the appropriate reactants, illustrated as follows for the compound of Example 9: diethyl N-(6,7-dimethoxy-2-methyl-3-quinolyl)aminomethylenemalonate is obtained by reacting 3-amino-6,7-dimethoxy-2-methylquinoline with diethyl ethoxymethylenemalonate; ethyl 8,9-dimethoxy - 1 - hydroxy-5-methylbenzo[f][1,7]naphthyridine-2-carboxylate is formed next in the cyclization step; and, 8,9 - dimethoxy - 1-hydroxy-5-methylbenzo[f][1,7]naphthyridine-2-carboxylic acid is prepared by hydrolysis of the ethyl ester.

The lower-alkyl esters of the acids of Examples 1-5 or 9-28 of Table A can be obtained either: by conversion of the acid to the carboxylic acid chloride by reaction with oxallyl chloride or phosphorous oxychloride and reaction of the acid chloride with a lower-alkanol, e.g., reaction of the acid chloride of the product of Example 1 with methanol, ethanol, n-butanol or n-hexanol yields its corresponding methyl, ethyl, n-butyl or n-hexyl ester; or, by following the procedure of Example 6 using corresponding molar equivalent quantities of the appropriate ethyl 1-hydroxybenzo[f][1,7]naphthyridine-2-carboxylate and lower-alkyl or lower-alkenyl ester, e.g., ethyl 1,4-dihydro - 5 - methoxy-4-methyl-1-oxobenzo[f][1,7]naphthyridine-2-carboxylate is obtained by reacting ethyl 1-hydroxy - 5 - methoxybenzo[f][1,7]naphthyridine-2-carboxylate (an intermediate for Example 12 of Table A) with methyl iodide.

Following the procedures described in Example 7 and using correspondingly molar equivalent quantities of the appropriate 1,4 - dihydro-1-oxo-4-$R_1$-benzo[f][1,7]naphthyridine-2-carboxylic acids of Examples 2-6 and 9-28 or their lower-alkyl esters and the appropriate lower-alkyl, lower alkenyl or benzyl ester, Z—An', the corresponding 6-quaternary ammonium salts can be obtained, for example: 6 - allyl - 1,4-dihydro-4-ethyl-1-oxobenzo[f][1,7]naphthyridinium-2-carboxylic acid bromide using the acid of Example 2 and allyl bromide; ethyl 6-n-butyl-1,4 - dihydro-4,5-dimethyl-1-oxobenzo[f][1,7]naphthyridinium-2-carboxylate iodide using the ethyl ester of Example 6 and n-butyl iodide; 6-benzyl-1,4-dihydro-4-methyl - 1-oxobenzo[f][1,7]naphthyridinium-2-carboxylic acid chloride using the product of Example 1 and benzyl chloride; and, 1,4-dihydro-6-(2-methoxybenzyl)-4-methyl-1-oxobenzo[f][1,7]naphthyridinium - 2 - carboxylic acid bromide using the product of Example 1 and 2-methoxybenzyl bromide.

Following the oxidative procedure described in Example 8 and using corresponding molar equivalent quantities of the appropriate 1,4-dihydro-1-oxo-4-$R_1$-6-Z-benzo[f][1,7]naphthyridinium-2-carboxylic acid (or ester) salts derived from the compounds of Examples 2-5, 15-17, 22, 23 and 25-28, the corresponding 1,5-dioxo-1,4,5,6 - tetrahydro-4-$R_1$-6-Z-benzo[f][1,7]naphthyridine-2-carboxylic acid (or ester) can be prepared, for example: 6-allyl-1,5-dioxo-4-ethyl - 1,4,5,6 - tetrahydro - benzo[f][1,7]naphthyridine-2-carboxylic acid, ethyl 6-n-butyl-4,9-dimethyl-1,5-dioxo - 1,4,5,6 - tetrahydro - benzo[f][1,7]naphthyridine-2-carboxylate, 6-benzyl-1,5-dioxo-4-methyl-1,4,5,6 - tetrahydro-benzo[f][1,7]naphthyridine-2-carboxylic acid and 6-(2-methoxybenzyl)-1,5-dioxo-4-methyl-1,4,5,6 - tetrahydro - benzo[f][1,7]naphthyridine - 2-carboxylic acid.

I claim:
1. A compound of the formula

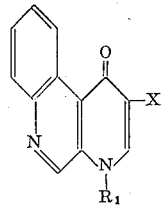

where X is a member selected from the group consisting of carboxy and lower-carbalkoxy, and $R_1$ is a member selected from the group consisting of lower-alkyl and lower-alkenyl.

2. A compound of the formula

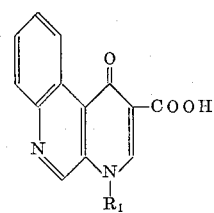

where $R_1$ is lower-alkyl.

3. A compound of the formula

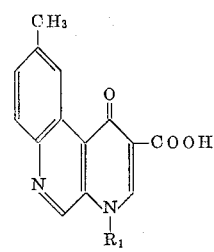

where $R_1$ is lower alkyl.

4. A compound of the formula

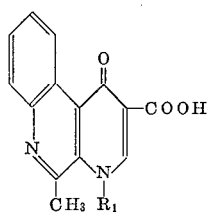

where $R_1$ is lower-alkyl.

5. 1,4 - dihydro-4-methyl-1-oxobenzo[f][1,7]naphthyridine-2-carboxylic acid.

6. 1,4 - dihydro - 4-ethyl-1-oxobenzo[f][1,7]naphthyridine-2-carboxylic acid.

7. 1,4 - dihydro - 1-oxo-4-n-propylbenzo[f][1,7]naphthyridine-2-carboxylic acid.

8. 4 - allyl - 1,4-dihydro-1-oxobenzo[f][1,7]naphthyridine-2-carboxylic acid.

9. 1,4 - dihydro-4,9-dimethyl-1-oxobenzo[f][1,7]naphthyridine-2-carboxylic acid.

10. 1,4 - dihydro - 4,5 - dimethyl - 1-oxobenzo[f][1,7]naphthyridine-2-carboxylic acid.

11. A compound of the formula

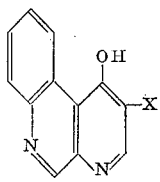

where X is a member selected from the group consisting of carboxy and lower-carbalkoxy.

12. 1-hydroxybenzo[f][1,7]naphthyridine-2-carboxylic acid.

13. 1 - hydroxy-9-methylbenzo[f][1,7]naphthyridine-2-carboxylic acid.

14. 1 - hydroxy-5-methylbenzo[f][1,7]naphthyridine-2-carboxylic acid.

15. A compound of the formula

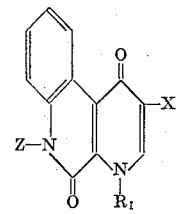

where X is a member selected from the group consisting of carboxy and lower-carbalkoxy; $R_1$ is a member selected from the group consisting of lower-alkyl and lower-alkenyl; and, Z is a member selected from the group consisting of lower-alkyl, lower-alkenyl and benzyl.

16. 4,6 - dimethyl - 1,5-dioxo-1,4,5,6-tetrahydrobenzo[f][1,7]naphthyridine-2-carboxylic acid.

No references cited.

ALEX MAZEL, *Primary Examiner.*

D. G. DAUS, *Assistant Examiner.*